(No Model.)
J. WHITCOMB & A. WOTRING.
TENSION DEVICE FOR GRAIN BINDERS.
No. 520,624. Patented May 29, 1894.
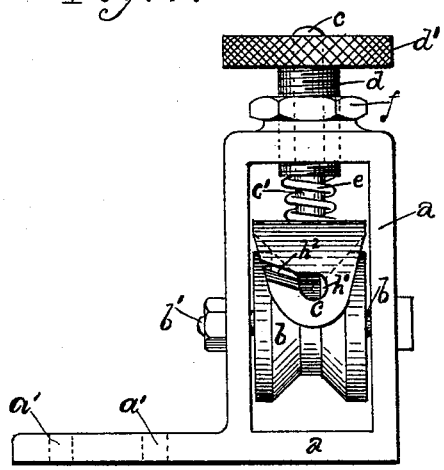
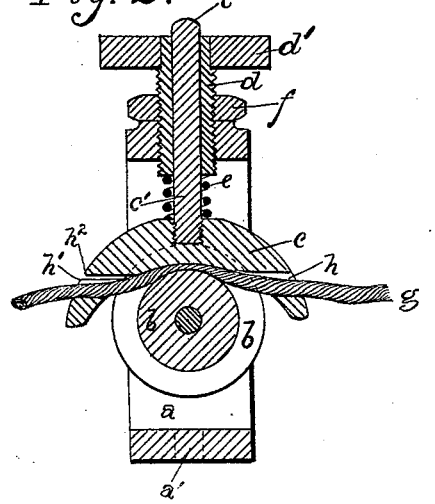
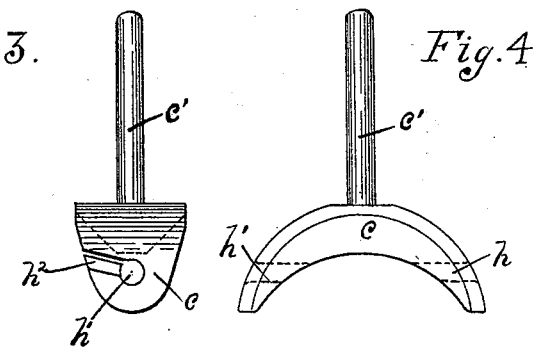
Witnesses.
Stephen Brophy
Frank B. Swayne.
Inventors.
James Whitcomb,
Amos Wotring,
By Hiram Hall,
Their Atty.
THE NATIONAL LITHOGRAPHING COMPANY,
WASHINGTON, D. C.

UNITED STATES PATENT OFFICE.

JAMES WHITCOMB AND AMOS WOTRING, OF OGDEN CENTRE, MICHIGAN.

TENSION DEVICE FOR GRAIN-BINDERS.

SPECIFICATION forming part of Letters Patent No. 520,624, dated May 29, 1894.

Application filed September 14, 1893. Serial No. 485,468. (No model.)

*To all whom it may concern:*

Be it known that we, JAMES WHITCOMB and AMOS WOTRING, citizens of the United States, residing at Ogden Centre, Lenawee county, Michigan, have jointly invented certain new and useful Improvements in Tension Devices for Grain-Binders, of which the following is a specification.

Twine used in harvesting machines for binding grain is usually uneven and knotty, and in passing through the tension device for regulating the tension upon such twine, breakages or stoppages are of frequent occurrence in the use of tension apparatus heretofore in use.

Our invention relates to and its object is to provide a device which shall be cheap and simple, and which will permit the passage of the twine, no matter how uneven it may be, without stoppage or breakage, and which may be quickly and easily "threaded." We attain these results by means of the mechanism and arrangement of parts hereinafter described, and shown in the accompanying drawings, made part hereof, in which—

Figure 1, is a side elevation of our tension device; Fig. 2, a central, vertical, sectional view of the same; Fig. 3, an end elevation of the shoe, hereinafter referred to, detached; and Fig. 4, a side elevation of the same.

Like letters of reference represent like parts throughout the several views.

In the drawings, $a$ represents the frame or housing of the device, which, by means of screws through screw-holes $a'$, may be attached to the binding mechanism of a harvesting machine, at any suitable point in the line of the feed of the binding-twine. In the housing is journaled a grooved tension-wheel, $b$, adapted to rotate on its shaft $b'$. The bottom of the groove of tension-wheel, $b$, is preferably flat. A curved shoe $c$, conforming in cross-section with the outline of the groove, partly embraces the wheel and rides in the groove thereof. Attached to or made part of the shoe, $c$, is a stem $c'$, longitudinally movable in an exteriorly screw-threaded sleeve, $d$, provided with a milled head, $d'$. The sleeve $d$ passes through a screw-threaded opening in the housing $a$. Interposed between the end of the sleeve $d$ and the shoe $c$ is spring $e$. Threaded sleeve $d$ is provided with a jam-nut, $f$. The pressure of the shoe upon the tension-wheel is controlled by the pressure of the spring $e$ upon the shoe, which is governed by the thrust of the threaded sleeve $d$, which is moved toward or from the shoe by means of the milled head $d'$, and the sleeve is held at any desired adjustment by the jam-nut, $f$.

To facilitate "threading" the tension-device, the extremities of the shoe $c$ are pierced, in the direction of the length of the shoe, with openings or eyes, $h$, $h'$. One of these eyes, ($h'$,) has a slotted opening, $h^2$, by means of which the twine may be slipped through the slot into eye $h'$, sidewise.

The operation of our device is obvious. The housing $a$, with its accompanying parts, being suitably secured in place, the end of the twine, $g$, is threaded through eye $h$, the shoe $c$ is slightly lifted and the tension-wheel is rotated, thus drawing the end of the twine through, between the shoe and wheel. The projecting end of the twine is now seized, and the twine is readily slipped sidewise through slot $h^2$ into eye $h'$, and the "threading" of the device is completed. The tension or pressure of the spring $e$, and the consequent pinch and friction upon the twine passing between the shoe $c$ and wheel $b$, is regulated by screwing the threaded sleeve $d$ toward or from the spring, by means of the milled head $d'$. As the size, weight, finish and quality of binding-twines used in harvesting machines greatly vary, the usefulness of the adjustable tension above described will be apparent. The proper tension for the twine in use having been determined, the jam-nut is set, thus holding the desired tension until it becomes necessary to change it.

Having fully described our invention, its construction and mode of operation, what we claim as our invention, and desire to secure by Letters Patent, is—

1. A tension device, comprising in its construction a housing, a tension-wheel journaled therein, a shoe riding upon said tension-wheel and provided with a suitable guide, and having at one extremity an eye and at the other end a slotted opening in the direction of its length, a spring pressing upon said shoe, and means for controlling the pressure of said spring, substantially as shown and described, for the purpose specified.

2. In a tension device, a curved friction-shoe, having at one end an eye and at the other end a slotted opening in the direction of the length of the shoe, substantially as shown and described, for the purpose specified.

JAMES WHITCOMB.
AMOS WOTRING.

Witnesses:
SAMUEL PIPER,
JACOB S. RINEHART.